United States Patent
Bao

(10) Patent No.: US 9,434,040 B2
(45) Date of Patent: Sep. 6, 2016

(54) UNLOADING AND FEEDING DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Yan-Cheng Bao, Shenzhen (CN)

(73) Assignees: HONG FU JIN PRECISION INDUSTY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 104 days.

(21) Appl. No.: 14/555,578

(22) Filed: Nov. 27, 2014

(65) Prior Publication Data

US 2015/0151934 A1    Jun. 4, 2015

(30) Foreign Application Priority Data

Nov. 30, 2013  (CN) .......................... 2013 1 0621717

(51) Int. Cl.
  *B23Q 16/00* (2006.01)
  *B23Q 7/04* (2006.01)
(52) U.S. Cl.
  CPC ............... *B23Q 16/001* (2013.01); *B23Q 7/04* (2013.01); *B23Q 16/006* (2013.01)
(58) Field of Classification Search
  CPC ....... B23Q 7/04; B23Q 16/001; B65G 47/46
  USPC ........ 414/749.1, 749.4, 749.6; 294/65, 87.1; 198/368, 468.2
  See application file for complete search history.

(56) References Cited

U.S. PATENT DOCUMENTS

| 5,358,087 A  * | 10/1994 | Moore | B23Q 16/006 192/138 |
| 6,478,135 B1 * | 11/2002 | Coakley | B23Q 1/0063 198/345.3 |
| 8,496,426 B2 * | 7/2013 | Na | G01R 31/2893 198/468.2 |

* cited by examiner

Primary Examiner — Ernesto Suarez
Assistant Examiner — Ronald Jarrett
(74) Attorney, Agent, or Firm — Zhigang Ma

(57) ABSTRACT

An unloading and feeding device can include a driving mechanism, a mounting member, two elastic assemblies, a rotating assembly, a pressing member, and a picking member. The driving mechanism can include a base plate having an edge, a movable assembly coupled to the base plate, a first limiting member coupled to the base plate adjacent to the edge, and a second limiting member coupled to the base plate away from the edge. The first limiting member and the second limiting member are positioned at opposite sides of the base plate. The mounting member can be coupled to the movable assembly. The elastic assemblies can be positioned at opposite sides of the movable assembly, corresponding to the first and second limiting members respectively. Each of the elastic members can include a movable member extending through the mounting member.

19 Claims, 6 Drawing Sheets

UNLOADING AND FEEDING DEVICE

FIELD

The subject matter herein generally relates to unloading and feeding devices.

BACKGROUND

Workpieces should be taken off a conveyor or out of storage, and positioned into a fixture on a processing machine before being machined. An unloading and feeding device can be used when positioning the workpieces.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
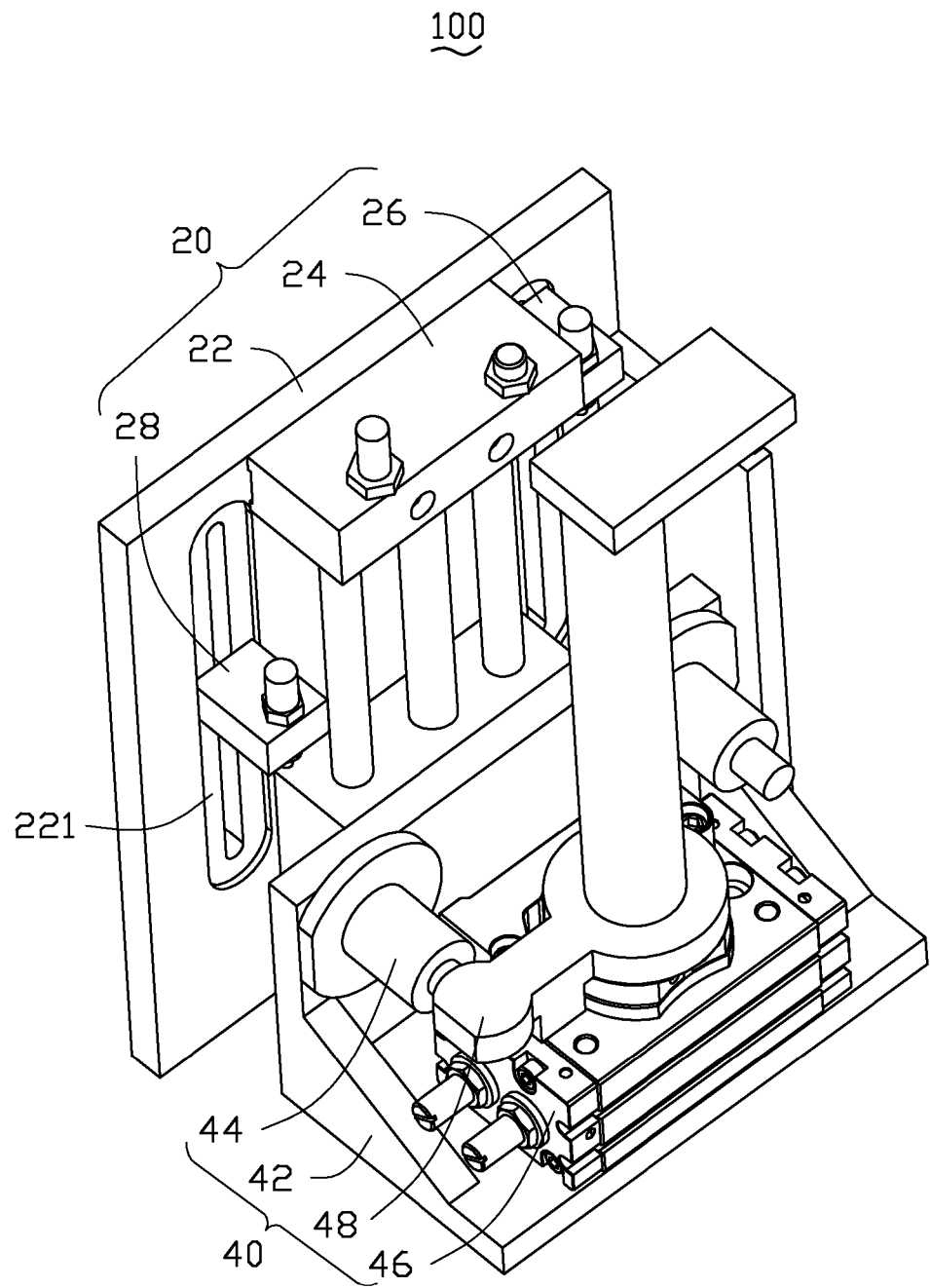
FIG. 1 is an isometric view of an embodiment of an unloading and feeding device, the unloading and feeding device including a driving mechanism and a rotating mechanism coupled to the driving mechanism, the rotating mechanism including a rotating assembly.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

The present disclosure is described in relation to an unloading and feeding device.

An unloading and feeding device can include a driving mechanism, a mounting member coupled to the driving mechanism, two elastic assemblies coupled to the mounting member, a rotating assembly coupled to the mounting member, a pressing member coupled to the rotating assembly, and a picking member coupled to the pressing member. The driving mechanism can include a base plate having an edge, a movable assembly coupled to the base plate, a first limiting member coupled to the base plate adjacent to the edge, and a second limiting member coupled to the base plate away from the edge. The first limiting member and the second limiting member are positioned at opposite sides of the base plate. The mounting member can be coupled to the movable assembly. The elastic assemblies can be positioned at opposite sides of the movable assembly, corresponding to the first and second limiting members respectively. Each of the elastic members can include a movable member extending through the mounting member. The rotating assembly can be configured to rotate the pressing member and the picking member, enabling the pressing member to press one of the movable members of the two elastic assemblies, causing the movable member to protrude out of the mounting member. The movable assembly can be configured to move the rotating assembly and the mounting member, enabling the movable member protruding out of the mounting member to resist against the corresponding first or second limiting member.

FIG. 1 illustrates an embodiment of an unloading and feeding device 100. The unloading feeding device 100 can be configured to pick a first workpiece (not shown) from a storage (not shown) with a height of H1, position the first workpiece onto a first workbench (not shown) with a height of H1, and pick a second workpiece (not shown) from the storage and position the second workpiece onto a second workbench (not shown) with a height of H2 different from the height of H1. The first workpiece on the first workbench can be positioned along a first direction. The second workpiece on the second workbench can be positioned along a second direction which can be opposite to the first direction.

The unloading and feeding device 100 can include a driving mechanism 20, and a rotating mechanism 40 coupled to the driving mechanism 20. The driving mechanism 20 can be configured to rotate the rotating mechanism 40 towards the storage. The rotating mechanism 40 can be configured to pick up the workpieces from the storage and position the workpieces onto the first workbench and the second workbench.

Figure 2:
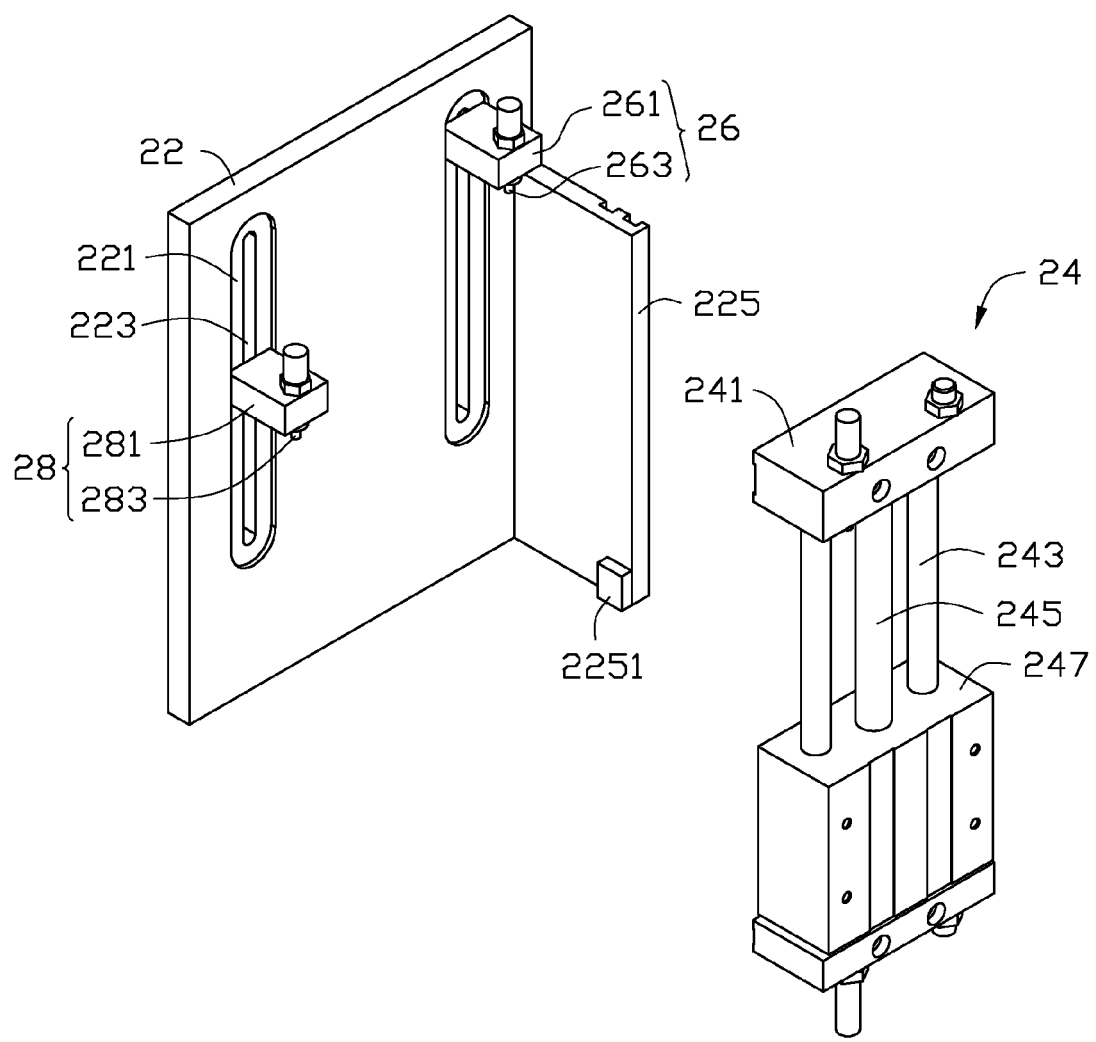
FIG. 2 is a partially exploded, isometric view of the driving mechanism of the unloading and feeding device of FIG. 1.

FIG. 2 illustrates that the driving mechanism 20 can include a base plate 22, a movable assembly 24, a first limiting member 26, and a second limiting member 28. The movable assembly 24, the first limiting member 26, and the second limiting member 28 can be coupled to the base plate 22.

The base plate 22 can be substantially a rectangular plate, and can define two mounting slots 221 and two mounting holes 223. The two mounting slots 221 can be parallel to each other, and can be positioned at opposite sides of the base plate 22, respectively. Each of the mounting slots 221 can be substantially an elongated groove extending along a longitude of the base plate 22. Each of the mounting holes 223 can be defined at a bottom surface of one mounting slot 221. The mounting hole 223 can be substantially an elongated hole extending along a longitude of the mounting slot 221. The base plate 22 can further provide a mounting portion 225 on a side. The mounting portion 225 can be adjacent to one of the mounting slots 221. The mounting portion 225 can provide a limiting sensor 2251 at an end. The limiting sensor 2251 can be configured to detect a final position of a movement of the movable assembly 24.

Figure 3:
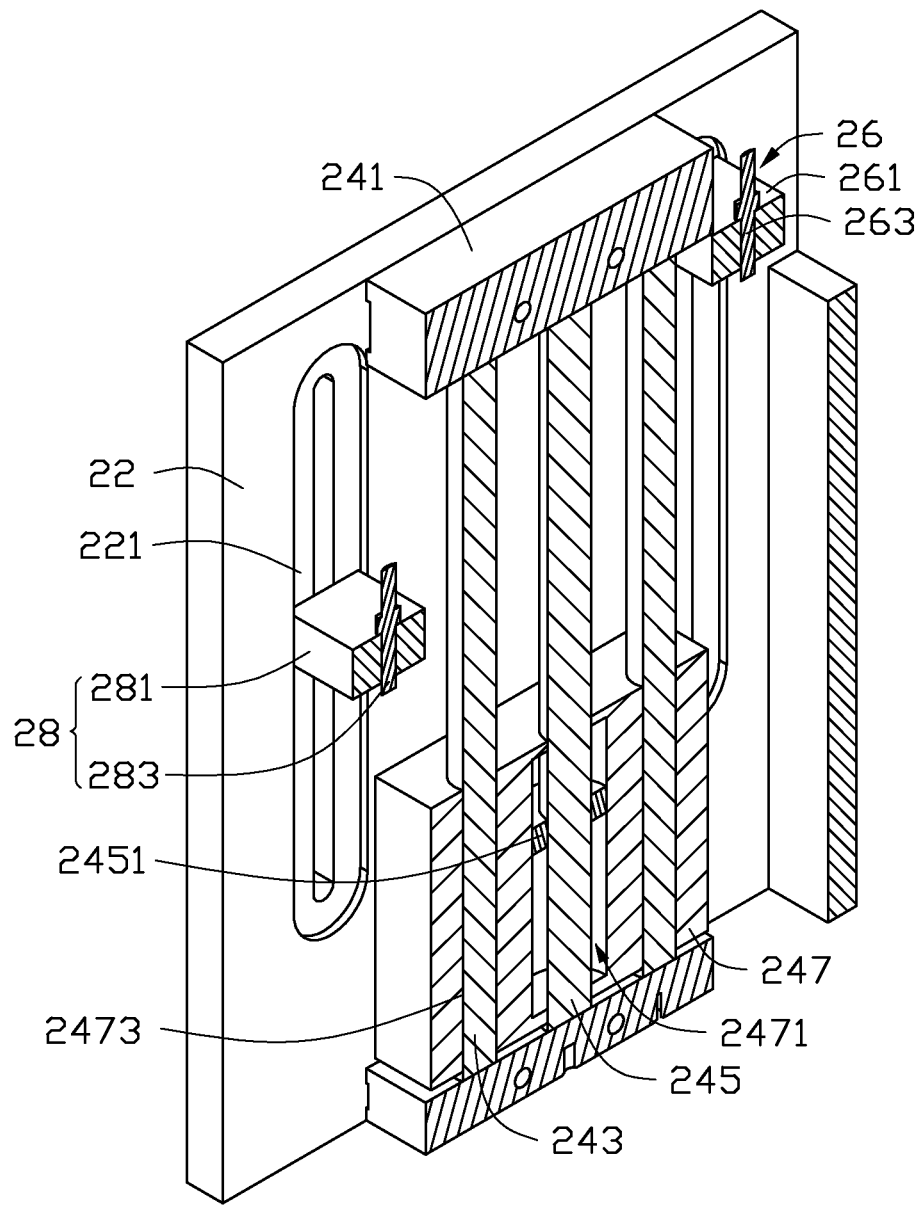
FIG. 3 is a cross sectional, isometric view of the driving mechanism of FIG. 1.

FIG. 3 illustrates that in the illustrated embodiment, the movable assembly 24 can be a linear actuator. The movable assembly 24 can include two bases 241, two guiding rods 243, a main rod 245, and a sliding member 247. The guiding rods 243 and the main rod 245 can be coupled to the bases 241. The sliding member 247 can be coupled to the guiding rods 243 and the main rod 245.

The two bases 241 can be positioned at opposite ends of the base plate 22, and can be positioned between the two mounting slots 221. Each of the guiding rods 243 can be substantially a cylindrical rod.

The two guiding rods 243 can be positioned adjacent to the mounting slots 221 respectively, and substantially parallel to the base plate 22. Opposite ends of each of the guiding rods 243 can be coupled to the bases 241 respectively. In an alternative embodiment, there can be one or more guiding rods 243.

The main rod 245 can be positioned between the two guiding rods 243, and substantially parallel to the guiding rods 243. Opposite ends of the main rods 245 can be coupled to the bases 241 respectively. The main rod 245 can provide a piston 2451.

In the illustrated embodiment, the sliding member 247 can be a cylinder block, and can be slidably sleeved on the guiding rods 243 and the main rod 245. The sliding member 247 can define a receiving cavity 2471 and two guiding holes 2473. The receiving cavity 2471 can be defined in the middle of the sliding member 247, and can extend through the sliding member 247. The sliding member 247 can be sleeved onto the piston 2451 via the receiving cavity 2471. A periphery of the piston 2451 can be hermetically sealed against an inside wall of the receiving cavity 2471. The piston 2451 can be configured for sliding in the receiving cavity 2471. The two guiding holes 2473 can correspond to the guiding rods 243 respectively, such that each of the guiding rods 243 can be slidably inserted through a corresponding guiding hole 1473.

The first limiting member 26 and the second limiting member 28 can be mounted in the guiding slots 221 respectively. The first limiting member 26 can be positioned at an end of the corresponding mounting slot 221 adjacent to an edge of the base plate 22. Such that the first limiting member 26 can be adjacent to one of the bases 241. In the illustrated embodiment, the first limiting member 26 can include a base body 261 coupled to the base plate 22, and a buffering portion 263 coupled to the base body 261. The buffering portion 263 can be made from elastic material and can act as a shock absorber. The second limiting member 28 can be positioned in the middle of the corresponding mounting slot 221. A structure of the second limiting member 28 can be similar to a structure of the first limiting member 26. The second limiting member 26 can include a base body 281 coupled to the base plate 22, and a buffering portion 283 coupled to the base body 281. The first and the second limiting members 26 and 28 can be configured to limit a rotation angle of the rotating mechanism 40.

Figure 4:
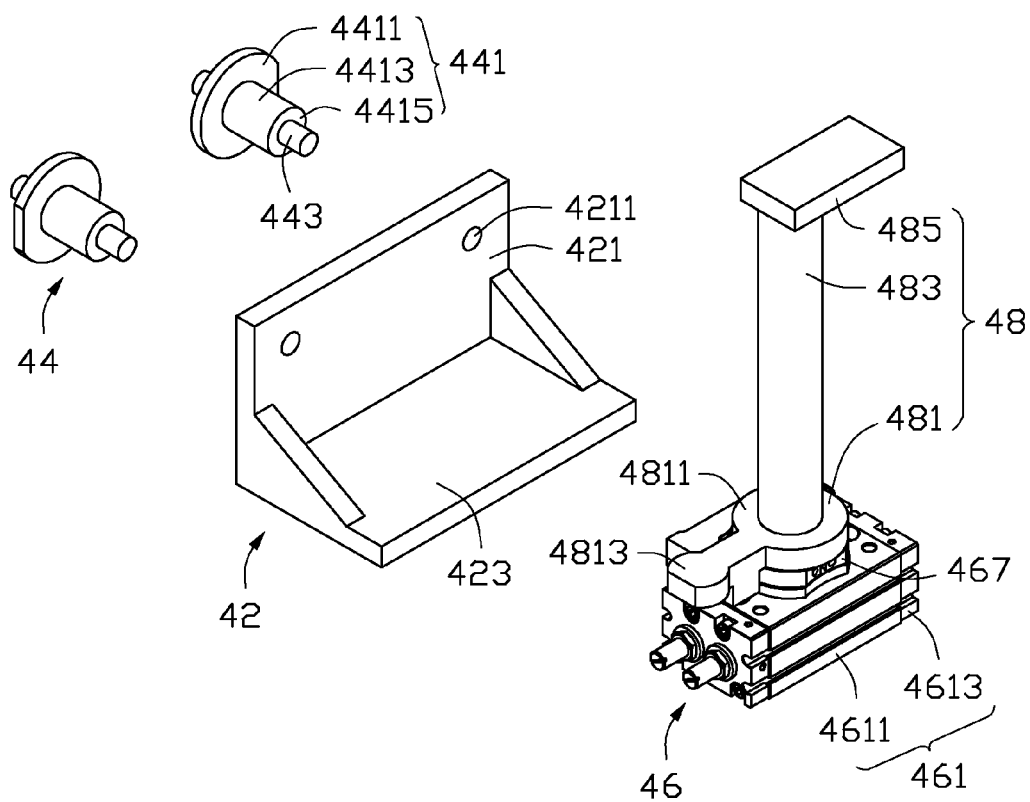
FIG. 4 is a partially exploded, isometric view of the rotating mechanism of the unloading and feeding device of FIG. 1.

FIG. 4 illustrates that the rotating mechanism 40 can include a mounting member 42, two elastic assemblies 44, a rotating assembly 46, and a picking assembly 48. The elastic assemblies 44 and the rotating assembly 46 can be coupled to the mounting member 42. The picking assembly 48 can be coupled to the rotating assembly 46.

The mounting member 42 can be substantially L-shaped, and can include a first mounting plate 421 and a second mounting plate 423 coupled to the first mounting plate 421. The first mounting plate 421 can be fixed to the sliding member 247, and can define two through holes 4211 corresponding to the two mounting slots 221. The second mounting plate 423 can be perpendicularly mounted to a side of the first mounting plate 421, and can extend along a direction away from the sliding member 247. The second mounting plate 423 can be configured to support the rotating assembly 46.

Figure 5:
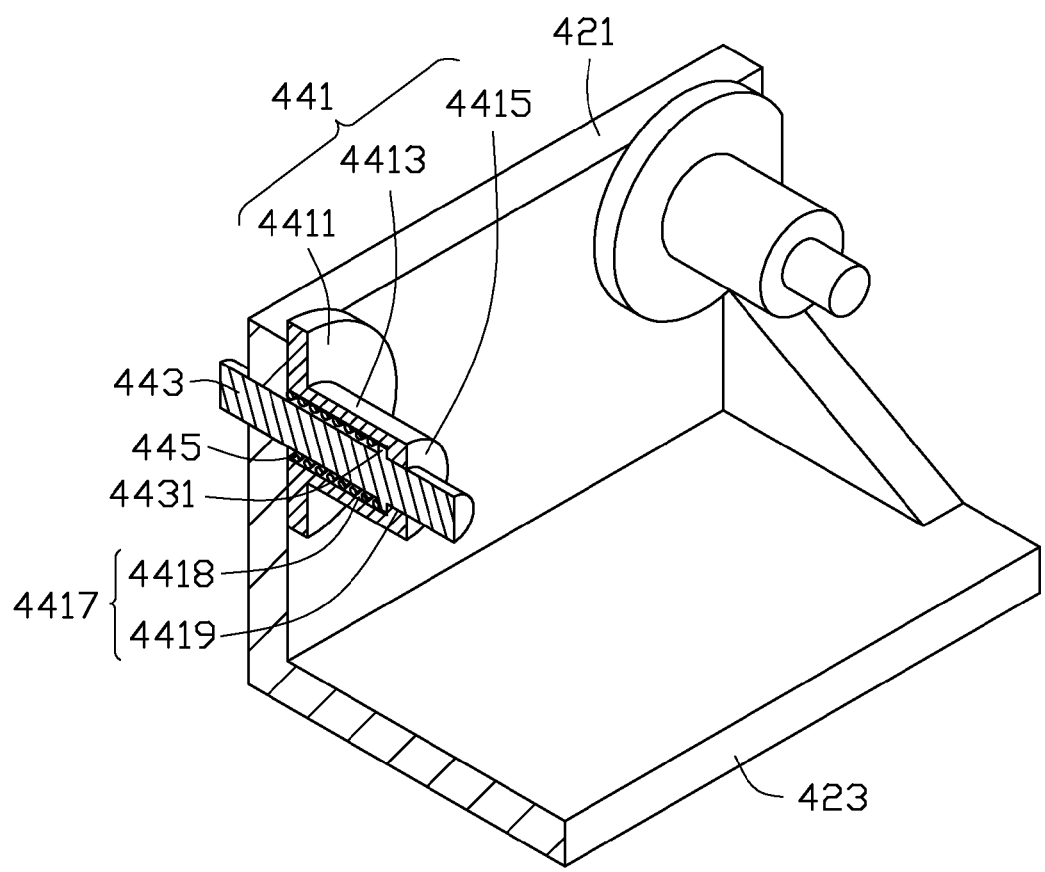
FIG. 5 is a partially cross sectional, isometric view of an elastic assembly of the rotating mechanism of FIG. 4.

FIG. 5 illustrates that the two elastic assemblies 44 can be positioned on the first mounting plate 421 corresponding to the two through holes 4211, respectively. Each of the elastic assemblies 44 can include a mounting seat 441, a movable member 443, and an elastic member 445. The mounting seat 441 can include a flange 4411 coupled to the first mounting plate 421, and a cylindrical portion 4413 formed at an end of the flange 4411 away from the first mounting plate 421. The cylindrical portion 4413 can define a resisting end 4415 at an end. The resisting end 4415 can be positioned away from the cylindrical portion 4413. A receiving hole 4417 can be defined along an axis of the mounting seat 441. In the illustrated embodiment, the receiving hole 4417 can be a stepped hole. The receiving hole 4417 can include a first receiving hole 4418 and a second receiving hole 4419. The first receiving hole 4418 can be coaxially aligned with the through hole 4211. A diameter of the first receiving hole 4418 can be greater than that of the through hole 4211. The second receiving hole 4419 can extend through the resisting end 4415. A diameter of the second receiving hole 4419 can be smaller than that of the first receiving hole 4418.

The movable member 443 can be movably inserted through the first receiving hole 4418, and opposite ends of the movable member 443 can be exposed from the mounting seat 441. A flange 4431 can be formed on the movable member 44. The flange 4431 can be received in the first receiving hole 4418, and can resist against the resisting end 4415. The elastic member 445 can be sleeved on the movable member 443 and be received in the first receiving hole 4418. Opposite ends of the elastic member 443 can resist against the first mounting plate 421 and the flange 4431 respectively. When the end of the movable member 443 facing rotating assembly 46, which is away from the flange 4411, is pressed by an external force, the movable member 443 can move along an axis of the receiving hole 4417, and the opposite end of the movable member 443 can protrude from the first receiving hole 4418 and the through hole 4211, such that the end of the movable member 334 can be aligned to the buffering portion 263 or 283.

Figure 6:
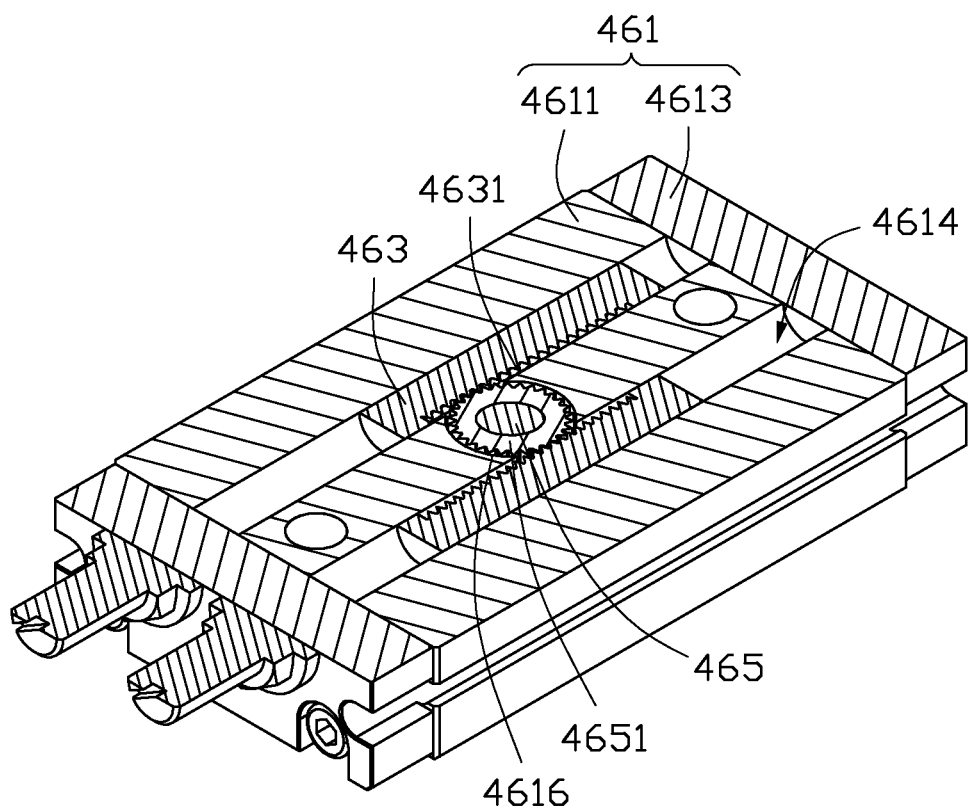
FIG. 6 is a partially cross sectional, isometric view of the rotating mechanism of FIG. 4.

FIG. 6 illustrates that in the embodiment, the rotating assembly 46 can be a rotary cylinder. The rotating assembly 46 can be positioned on a surface of the second mounting plate 423 adjacent to the first limiting member 26. The rotating assembly 26 can include a cylinder 461, two toothed pistons 463, a rotating member 465, and a driving member 467. The toothed pistons 463 and the rotating member 465 can be received in the cylinder 461. The driving member 467 can be coupled to the rotating member 465.

The cylinder 461 can include a main body 4611 and two covers 4613 positioned at opposite ends of the main body 4611 respectively. The main body 4611 can be positioned on the second mounting plate 432, and can define two first cavities 4614 and a second cavity 4616. The two first cavities 4614 can be parallel to each other. Axes of the first cavities 4614 can be parallel to the second mounting plate 423. The first cavities 4614 can be configured to receive the toothed pistons 463. The second cavity 4616 can be defined between the two first cavities 4614. An axis of the second cavity 4616 can be substantially perpendicularly to the axis of the first cavities 4614. Opposite sides of the second cavity 4616 can communicate with the two first cavities 4614 respectively.

Each of the toothed pistons 463 can be received in a corresponding first cavity 4614, capable of sliding along an axis of the first cavity 4614. The toothed piston 463 can provide a toothed portion 4631 at a side facing the second cavity 4616.

The rotating member 465 can be rotatably positioned in the second cavity 4616, and can provide a gear 4651 corresponding to the first cavities 4614. Opposite sides of the gear 4651 can mesh with the toothed portions 4631 respectively.

The driving member 467 can be positioned on the main body 4611 and fixed to an end of the rotating member 465. In the illustrated embodiment, the driving member 467 can be a connecting flange. The toothed portions 4631 can rotate the rotating member when sliding in the first cavities 4614, which in turn rotates the driving member 467.

FIG. 4 illustrates that the picking assembly 48 can include a pressing member 481, a connecting rod 483 coupled to the pressing member 481, and a picking member 485.

The pressing member 481 can include a connecting portion 4811 and, a pressing portion 4813 formed on the connecting portion 4811. The connecting portion 4811 can be fixed to the driving member 467. The pressing portion 4813 can be formed at a side of the connecting portion 4811 extending along a direction away from the connecting portion 4811. The pressing portion 4813 can be configured to press an end of the movable member 443. The connecting rod 483 can be perpendicularly positioned on the connecting portion 4811. The picking member 485 can be positioned at an end of the connecting rod 483 away from the connecting portion 4811. The picking member 485 can be configured to pick workpieces from the storage. In at least one embodiment, the picking member 485 can be a vacuum chuck. In an alternative embodiment, the picking member 485 can be a clamp, or a magnetic member.

In assembly, the movable assembly 24, the first limiting member 26, and the second limiting member 28 can be mounted to the base plate 33. The mounting member 42 can be fixed to the sliding member 247. The elastic assembly 44 can be mounted on the first mounting plate 421. The rotating assembly 46 can be mounted to the second mounting plate 423. The picking assembly 48 can be coupled to the driving member 467, enabling the pressing portion 4813 to press the movable member 443, which is corresponding to the second limiting member 28.

In operation, the unloading and feeding device 100 can be positioned on an automatic conveyor (not shown) adjacent to the storage (not shown). The automatic conveyor can be capable of transporting an object from a first position to a second position automatically. The rotating assembly 46 can be away from the first and the second limiting members 26 and 28. The pressing portion 4813 can press an end of the movable member 443, which is corresponding to the second limiting member 28, such that the opposite end of the movable member 443 can be corresponding to the buffering portion 283 of the second limiting member 28. The unloading and feeding device 100 can be started. The sliding member 247 can drive the rotating mechanism 40 to slide on the guiding rods 243. When the movable member 443 resists against the buffering portion 283, the sliding member 247 can stop from sliding. The picking member 485 can pick a first workpiece (not shown) from the storage. The sliding member 247 can move the rotating mechanism 40 with the first workpiece to the original position on the guiding rods 243.

The automatic conveyor can transport the unloading and feeding device 100 to the first workbench (not shown) with a height of H1. The sliding member 247 can move the rotating mechanism 40 along the guiding rods 243. When the movable member 443 presses the buffering portion 283, the sliding member 247 can be controlled to stop from sliding. The picking member 485 positions the first workpiece on the first workbench. The sliding member 247 moves the rotating mechanism 40 back to the original position, and the automatic conveyor can transport the unloading and feeding device 100 back to the storage.

The sliding member 247 can drive the rotating mechanism 40 to pick up a second workpiece from the storage, and the rotating mechanism 40 can be replaced. The automatic conveyor can transport the unloading and feeding device 100 to the second workbench (not shown) with a height of H2. The rotating assembly 46 rotates, and the driving member 467 can rotate the picking assembly 48 with the second workpiece about 180 degrees. The pressing portion 4813 can press an end of the movable member 443, which is corresponding to the first limiting member 26, such that the opposite end of the movable member 443 can be corresponding to the buffering portion 263 of the first limiting member 26. The sliding member 247 can move the rotating mechanism 40 along the guiding rods 243. When the movable member 443 presses against the buffering portion 263, the sliding member 247 can be controlled to stop from sliding. The picking member 485 can position the second workpiece on the second workbench.

In an alternative embodiment, the mounting slots 221 and the mounting holes 223 can be omitted, such that the first limiting member 26 can be mounted to the base plate 22 adjacent to one of the bases 241, and the second limiting member 28 can be positioned between the two bases 241.

In an alternative embodiment, the base plate 22 can be omitted. Such that the first and second limiting members 26 and 28 can be mounted to the bases 241 or to a certain portion of the guiding rods 243.

In an alternative embodiment, the movable assembly 24 can be other linear driving mechanisms. For example, but not limited to, the movable assembly 24 can be a screw-nut mechanism. Such that the main rod 245 can be a guide screw defining an external thread. The sliding member 247 can be sleeved on the main rod 245 and can mesh with the external thread, enabling the main rod 245 to move the sliding member 247 along the axis of the guiding rods 243.

In another example, the movable assembly 24 can be an ordinary cylinder that can reciprocate, the ordinary cylinder can include a driving end configured to couple to and drive an external mechanism. Such that the ordinary cylinder can be mounted to the base plate 22. The sliding member 247 can be coupled to the driving end of the ordinary cylinder, enabling the ordinary cylinder to move the sliding member 247 along the axis of the guiding rods 243.

In alternative embodiments, the rotating assembly 46 can be other rotary driving mechanisms. For example, but not limited to, the rotating assembly 46 can be a decelerator driven by a rotary motor. The picking assembly 48 can be coupled to the decelerator, enabling the decelerator to drive the picking assembly 48 to rotate to a certain angle.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure, as defined by the appended claims.

What is claimed is:

1. An unloading and feeding device comprising:
    a driving mechanism comprising:
        a base plate having an edge;
        a movable assembly coupled to the base plate;
        a first limiting member coupled to the base plate adjacent to the edge; and
        a second limiting member coupled to the base plate away from the edge, wherein the first limiting member and the second limiting member is positioned at opposite sides of the base plate;
    a mounting member coupled to the movable assembly;
    two elastic assemblies coupled to the mounting member and positioned at opposite sides of the movable assembly, and corresponding to the first and second limiting members respectively; each of the elastic members comprising:
        a movable member extending through the mounting member;
    a rotating assembly coupled to the mounting member;
    a pressing member coupled to the rotating assembly; and
    a picking member coupled to the pressing member, wherein the rotating assembly is configured to rotate the pressing member and the picking member, enabling the pressing member to press one of the movable members of the two elastic assemblies, causing the movable member to protrude out of the mounting member; the movable assembly is configured to move the rotating assembly and the mounting member, enabling the movable member to protrude out of the mounting member to resist against the corresponding first or second limiting member.

2. The unloading and feeding device of claim 1, wherein the movable assembly comprises two bases positioned on the base plate spaced from each other, a main rod coupled to the bases, and a sliding member slidably sleeved on the main rod; opposite ends of the main rod are coupled to the bases respectively, the mounting member is coupled to the sliding member.

3. The unloading and feeding device of claim 2, wherein the movable assembly further comprises a piston coupled to the main rod, the sliding member defines a receiving cavity, the main rod extends through the receiving cavity, the piston is received in the receiving cavity.

4. The unloading and feeding device of claim 2, wherein the movable assembly further comprises at least one guiding rod coupled to the bases and parallel to the main rod, and movably extends through the sliding member.

5. The unloading and feeding device of claim 1, wherein the rotating assembly comprises a cylinder coupled to the mounting member and a rotating member received in the cylinder, the pressing member is coupled to the rotating member.

6. The unloading and feeding device of claim 5, wherein the rotating assembly further comprises a toothed piston having a toothed portion thereon; the cylinder defines a first cavity and a second cavity communicating with the first cavity; the toothed piston is received in the first cavity and the toothed portion faces the second cavity; the rotating member is positioned in the second cavity and having a gear thereon, the gear meshes with the toothed portion.

7. The unloading and feeding device of claim 6, wherein the rotating assembly further comprises a driving member coupled to the rotating member; the pressing member is coupled to the driving member.

8. The unloading and feeding device of claim 1, wherein the mounting member comprises a first mounting plate coupled to the movable assembly and a second mounting plate coupled to the first mounting plate; the elastic members is mounted to the first mounting plate, the rotating assembly is mounted to the second mounting plate.

9. The unloading and feeding device of claim 8, wherein each of the elastic assemblies comprises a mounting seat and an elastic member, the mounting seat is mounted to the mounting member, the movable member extends through the mounting seat and an end of the movable member protrudes out of the mounting member; the movable member provides a flange thereon, the elastic member is sleeved on the movable member and received in the mounting seat; opposite ends of the elastic member resist against the first mounting plate and the flange respectively.

10. The unloading and feeding device of claim 9, wherein the first limiting member comprises a base body coupled to the base plate, and a buffering portion coupled to the base body; the buffering portion is aligned to an end of the corresponding movable member.

11. The unloading and feeding device of claim 10, wherein a structure of the second limiting member is similar to a structure of the first limiting member; the second limiting member comprises a base body coupled to the base plate, and a buffering portion coupled to the base body.

12. The unloading and feeding device of claim 11, wherein the unloading and feeding device further comprises a connecting rod coupled to the pressing member; the picking member is coupled to the connecting rod; the pressing member provides a pressing portion thereon configured to resist against an end of the movable member.

13. An unloading and feeding device comprising:
    a driving mechanism comprising:
        a base plate having an edge;
        a movable assembly coupled to the base plate;
        a first limiting member coupled to the base plate; and
        a second limiting member coupled to the base plate, wherein the first limiting member and the second limiting member is positioned at opposite sides of the base plate, a distance between the first limiting member and the edge is smaller than the same between the second limiting member and the edge;
    a mounting member coupled to the movable assembly;
    two elastic assemblies coupled to the mounting member and positioned at opposite sides of the movable assembly, and corresponding to the first and second limiting members respectively; each of the elastic members comprising:
        a movable member extending through the mounting member;
    a rotating assembly coupled to the mounting member;
    a pressing member coupled to the rotating assembly; and
    a picking member coupled to the pressing member, wherein the rotating assembly is configured to rotate the pressing member and the picking member, enabling the pressing member to press one of the movable members of the two elastic assemblies, causing the movable member to protrude out of the mounting member; the movable assembly is configured to move the rotating assembly and the mounting member, enabling the movable member to protrude out of the mounting member to resist against the corresponding first or second limiting member.

14. The unloading and feeding device of claim 13, wherein the movable assembly comprises two bases positioned on the base plate spaced from each other, a main rod coupled to the bases, and a sliding member slidably sleeved on the main rod; opposite ends of the main rod are coupled to the bases respectively, the mounting member is coupled to the sliding member.

15. The unloading and feeding device of claim 14, wherein the movable assembly further comprises a piston coupled to the main rod, the sliding member defines a receiving cavity, the main rod extends through the receiving cavity, the piston is received in the receiving cavity.

16. The unloading and feeding device of claim 14, wherein the movable assembly further comprises at least one guiding rod coupled to the bases and parallel to the main rod, and movably extends through the sliding member.

17. The unloading and feeding device of claim 13, wherein the rotating assembly comprises a cylinder coupled to the mounting member and a rotating member received in the cylinder, the pressing member is coupled to the rotating member.

18. The unloading and feeding device of claim 17, wherein the rotating assembly further comprises a toothed piston having a toothed portion thereon; the cylinder defines a first cavity and a second cavity communicating with the first cavity; the toothed piston is received in the first cavity and the toothed portion faces the second cavity; the rotating member is positioned in the second cavity and having a gear thereon, the gear meshes with the toothed portion.

19. The unloading and feeding device of claim 13, wherein the mounting member comprises a first mounting plate coupled to the movable assembly and a second mounting plate coupled to the first mounting plate; the elastic members is mounted to the first mounting plate, the rotating assembly is mounted to the second mounting plate.

* * * * *